United States Patent Office 2,887,328
Patented May 19, 1959

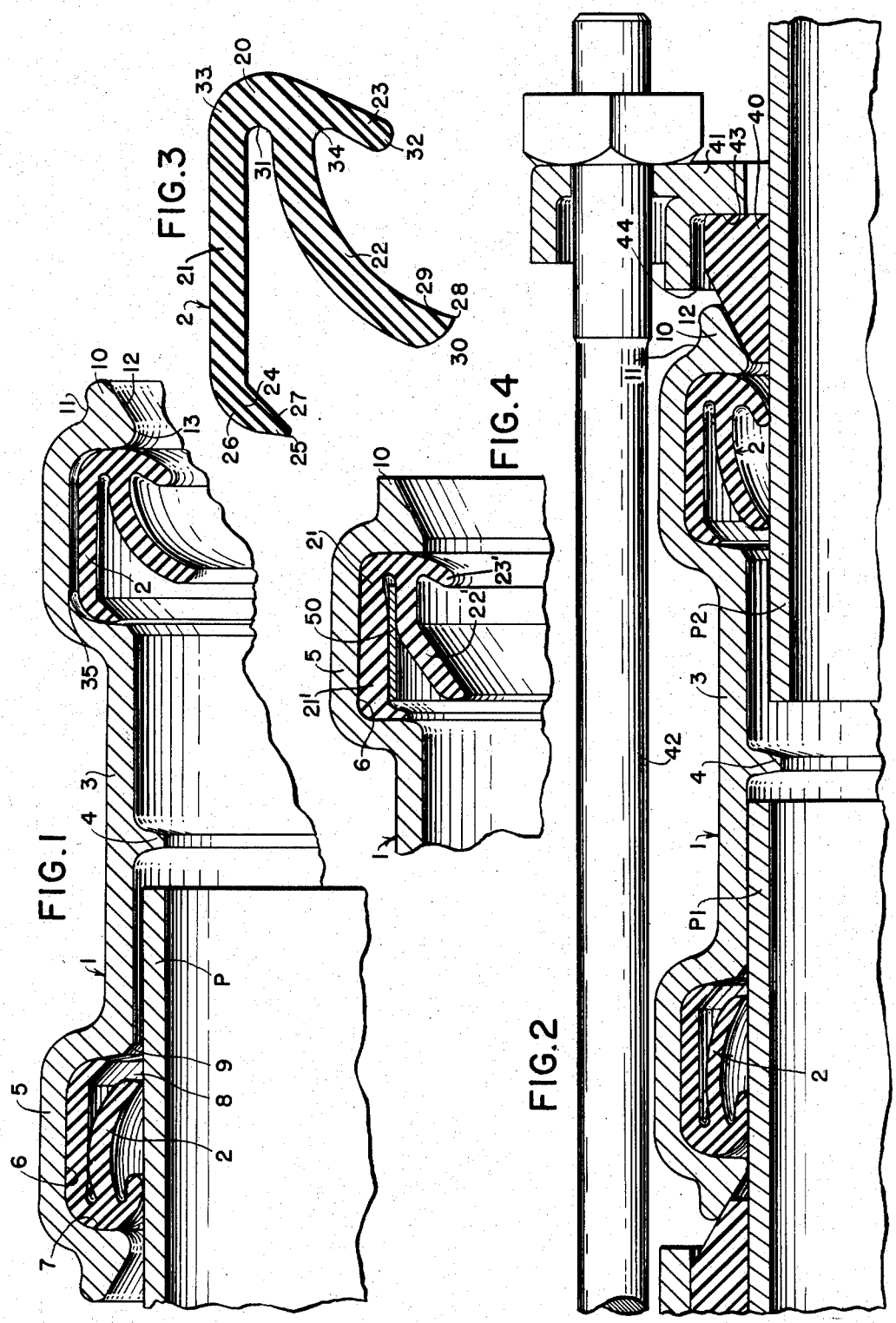

2,887,328

PRESSURE-SEALING COUPLING FOR PLAIN END PIPE

Roger E. Risley and Frederick T. Newell, Bradford, Pa., assignors to Dresser Industries, Inc., a corporation of Delaware Application April 21, 1955, Serial No. 502,953

7 Claims. (Cl. 285—110)

The present invention relates to pipe couplings of the type that are self-sealing by the action of line pressure. Couplings in accordance with the invention are applicable to large size pipe, for example pipe having a diameter of two feet or more, as well as to smaller pipe sizes.

It is an object of the present invention to provide pipe couplings that are inexpensive to manufacture, are easily installed and provide a lasting fluidtight seal. The couplings in accordance with the invention are of extremely simple construction, comprising merely an endless middle ring or sleeve portion and self-sealing gaskets of special configuration. Installation of the couplings is effected merely by stabbing the ends of pipe sections into the coupling. No bolting, clamping, tightening, or other operations, are required. The couplings are substantially foolproof in the sense that the human element in tightening up bolts or performing other operations customary in installing present couplings is eliminated. As the couplings are used on plain end pipe, it is unnecessary to thread, groove, flare, machine, or otherwise specially prepare the pipe ends. Unlike couplings having compression-type gaskets, the couplings in accordance with the invention do not apply any pressure tending to collapse the pipe and it is hence possible to use relatively thin wall pipe, even in the larger diameters. The couplings are suitable not only for metal pipe but also for pipe made of glass, asbestos, plastic and other materials.

A further feature of the pipe couplings in accordance with the invention is that their outside diameter is only a little larger than that of the pipe so that material savings in cutting pavement and trenching for underground pipe can be effected. The couplings have a smoothly curved exterior, free from bolts, lugs, flanges or other projections. This, in combination with the small overall diameter, makes the couplings easy to coat or cover for corrosion protection. Moreover, even if corrosion should occur, it would not impair the sealing properties of the coupling. If desired, couplings in accordance with the invention can be installed on pipe having a protective coating without removing the coating from the end portions of the pipe.

A further object of the invention is to provide a coupling of the self-sealing type that not only seals against leakage of fluid from the pipe line but also prevents the ingress of ground or surface water or other outside fluid. The coupling thus provides a two-way seal. Moreover, the couplings in accordance with the invention will accommodate oversized and undersized pipe within a considerable range without the need of adjustment. The construction of the coupling is also such that, in the event any leakage should occur, for example because of imperfection in the portion of a pipe engaged by the coupling, a "repair" can be effected quickly and easily.

Other characteristics, objects and advantages of the invention will be understood from the following description and claims in conjunction with the accompanying drawings, in which:

Fig. 1 is a radial section of a pipe coupling in accordance with the invention, a pipe being shown inserted in the left hand end only of the coupling.

Fig. 2 is a similar section showing an oversized pipe inserted in the left hand end of the coupling and an undersized pipe inserted in the right hand end. This figure also shows the application of a repair device to the coupling.

Fig. 3 is an enlarged cross section of the gasket in free condition.

Fig. 4 is a partial axial section similar to Fig. 1 but showing another form.

As illustrated in the drawings, the coupling comprises a sleeve or middle ring 1 and self-sealing gaskets 2. The middle ring 1 is of endless construction and has a tubular central portion 3 that is substantially cylindrical and is provided on its interior with a pipe stop 4. The central portion 3 of the middle ring is of an internal diameter to receive the end of a pipe section P. If the pipe is of maximum size within the permissible range of the nominal size for which the coupling is designed, it will fit snugly, as indicated by the pipe end P1 in Fig. 2. If the pipe is of minimum diameter, as illustrated at P2 in Fig. 2, there will be an annular space between the pipe wall and the sleeve portion 3. At each end of the central portion 3 there is an integral channel portion 5 providing an annular inwardly opening channel 6. The channel 6 is of generally rectangular cross section, having a substantially cylindrical peripheral wall, an outer end wall 7 and an inner end wall 8. The end walls 7 and 8 are approximately normal to the axis of the coupling but are slightly inclined, for example at an angle of about 5° to a normal plane. At their outer peripheries the end walls 7 and 8 merge into the peripheral wall of the channel 6 in smooth curves. The radially inner portion of the inner end wall 8 is beveled as indicated at 9 to provide a tapered entrance to the central portion 3. The channel 6 preferably has a width in an axial direction substantially greater than its depth in a radial direction and is preferably two or three times as wide as it is deep. For most economical utilization of the metal or other material from which the middle ring 1 is formed, the thickness of the portion 5 should be approximately equal to that of the portion 3, which means that the portions 5 have a larger outside diameter than the central portion 3 in order to provide the channels as described. The middle ring shown in the drawings may be formed either by rolling a section of skelp of proper cross section into ring form and welding the ends together, or by rolling the channels into a previously formed tubular section.

An annular flange portion 10 projecting axially beyond the channel portion 5 has an approximately cylindrical outer surface 11 and an inwardly inclined conical surface 12 that forms an acute angle to the axis of the coupling, preferably an angle of about 30° to 45°. The inwardly inclined surface 12 is joined to the outer end surface 7 of the channel 6 by a rounded corner portion 13 forming a pipe-receiving aperture which has an inside diameter, with respect to the axis of the coupling, approximately equal to that of the inner surface of the central portion 3 of the middle ring.

The gasket 2 is molded or otherwise suitably formed of a rubber composition or other elastomer material that is fairly firm but yet stretchable, for example a material having a durometer of approximately 65 to 75. For convenience, the material is herein referred to as "rubber." The gasket is made endless either by initially molding it as an endless ring or by forming an extruded or molded length into a ring and joining the ends, for example adhesively or by vulcanizing. In cross sectional shape, the gasket comprises an outer end portion 20 from which three integral annular flanges or lips 21, 22 and 23 radiate. The outer or peripheral flange 21 is substantially cylindrical and of uniform thickness except for an inwardly inclined and tapered inner end portion 24 that terminates in a tip portion 25. It will be seen that the outer surface 26 of the end portion 24 is rounded while the inner surface is substantially straight as viewed in cross section and at an obtuse angle to the inner surface of the main portion of the outer flange 21. The two surfaces intersect at an angle of the order of 30° to 45° to form the tip 25. The inward extent of the end portion 24 in a radial direction is less than the radial depth of the channel 6 of the middle ring so that when the gasket is in the channel, the tip seats on the inner end surface 8 to provide a seal.

The intermediate flange or lip 22 of the gasket 2 extends inwardly both axially and radially from the end portion 20. The root portion of the lip 22 is almost parallel to the outer flange 21 but the lip then curves radially inwardly so that its inner end portion is inclined at an angle of the order of 45° to the axis of the coupling. The lip 22 is shown as being of substantially uniform thickness except for a beveled tip portion 28 formed by the intersection of the inner surface 29 of the lip and an end surface 30 which curves inwardly to intersect the inner surface at an angle of the order of 45° to 90°. The tip 28 of the lip 22 defines a pipe-receiving aperture having an inside diameter which is less than the outside diameter of the pipe so that the tip portion of the lip 22 is stretched when the pipe is inserted and hence engages the pipe with an initial sealing pressure. The amount of stretch is kept below the critical value for the rubber composition of the gasket to assure long gasket life and avoid development of cracks. Thus, for example, with a gasket having a critical value of 5%, the internal diameter of the tip portion 28 of the lip 22 is calculated to provide a maximum stretch of about 4%. The lip 22 is sufficiently wide as to be capable of flexing to receive the pipe without being stressed beyond the critical value of the rubber and to provide ease of stabbing. As shown, the lip 22 is approximately as wide as the peripheral flange 21 but is enough narrower that, when the lip is flexed radially outwardly, the tip 28 of the lip 22 does not reach the inner wall 8 of the recess 6 and does not interfere with the seating or sealing of the tip portion 25 of the flange 21 on the inner end wall 8 of the channel. The outer surface of the lip 22 joins the inner surface of the outer flange 21 in a curve 31 having a radius sufficiently large to avoid local stressing of the rubber beyond its critical value. The curvature of the lip 22 as viewed in cross section also assists in avoiding local stress while assuring that under all conditions the extreme tip portion of the lip engages the pipe so that line pressure increases the effectivness of the seal between the lip and the pipe rather than exerting a separating force.

The inner flange or lip 23 is also inclined inwardly, both axially and radially, from the end portion 20 at an angle greater than 45° to the axis of the coupling, for example an angle of the order of 60° to 80°. All three lips of the gasket are thus disposed in a single quadrant defined by perpendicular axes intersecting at said end portion 20. At its inner edge, the lip 23 terminates in a rounded tip portion 32. The lip 23 is substantially narrower than the lip 22, being preferably less than half as wide. Although the lip 23 projects radially inwardly at a greater angle to the axis of the coupling, the inner diameter of the tip portion 32—considered as a ring— is greater than that of the tip portion 28 of the lip 22. In other words, the lip 23 does not project radially inwardly as far as the lip 22 in the unconfined condition of the gasket as illustrated in Fig. 3. The outer surface of the lip 23 merges smoothly into that of the end portion 20 which in turn joins the outer surface of the outer flange portion 21 in a smooth curve 33. The axially inner surface of the lip 23 joins the lip 22 in a smooth curve 34. Although the thickness of the lip 23 is no greater than that of the lip 22, and may even be a little less, the lip 23 is stiffer than the lip 22 because of its lesser width. The internal diameter of the tip portion 32 is smaller than the outside diameter of even minimum-sized pipe so that the lip engages a pipe inserted in the coupling to provide a seal.

The overall axial width of the gasket 2 in unconfined condition, measured from the outer surface of the outer end portion 20 to the tip 25 at the inner end of the flange 21, is greater than the axial width of the channel 6 between the end walls 7 and 8 so that when the gasket is fitted into the channel the tip portion 25 is pressed firmly against the inner end wall 8 of the channel by the inherent resiliency of the composition from which the gasket is formed to provide an initial seal. The end portion 24 of the flange 21 of the gasket is also preferably inclined at a smaller angle to the axis of the coupling than the end wall 8 of the middle ring channel so that there is an angular flexing of the end portion 24 when the gasket is fitted into the channel. For example, if the end wall 8 of the channel is inclined at an angle of 85° to the axis of the coupling, the end face of the end portion 24 of the gasket is preferably about 75°. This assures that the extreme tip portion 25 engages the end wall of the channel. The outer diameter of the flange portion 21 of the gasket is somewhat less than the inside diameter of the channel 6 so that, when the gasket is placed in the channel but no pressure is applied to it, there will be an annular space 35 (see right hand end of Fig. 1) between the gasket and the wall of the channel. The initial radial clearance between the gasket and the peripheral wall of the channel 6 permits the gasket readily to adjust itself in the channel to provide an initial seal with out-of-round pipe. When pressure is thereafter applied to the gasket, for example by the internal pressure of the pipe line, the gasket is expanded radially and circumferentially so that it seats smoothly in the channel 6 without wrinkling. The smooth seating of the gasket in the channel and freedom from wrinkling further assures a fluidtight seal between the gasket and the middle ring.

In installing a pipe line, the end of a pipe section P is stabbed into the coupling, as illustrated at the left hand end of Fig. 1, after the gasket 2 has been positioned in the channel 6 of the middle ring, as illustrated at the right hand end of the same figure. In the stabbing operation, the pipe end is guided into centered relationship with the coupling by the inclined surface 12 of the axially projecting portion 10. The end of the pipe first engages the lip 23 of the gasket and flexes and stretches this lip sufficiently for the pipe to pass through. It then engages the lip 22 which likewise flexes and stretches sufficiently to receive the pipe. The beveled surface 9 further guides the pipe into the central portion 3 of the middle ring, its movement being limited by the pipe stop 4. Engagement of the gasket with the approximately perpendicular inner wall 8 of the channel 6 assists in preventing the gasket from being displaced by the forces applied to it when the pipe is stabbed in. It has been found that the generally rectangular cross section of the channel and corresponding shape of the gasket inhibits both axial displacement and objectionable rolling of the gasket. The cross sectional shape of the gasket and in particular the radial thickness provided by the end portion 24 of the outer flange 21, the outer end portion 20 and the flange 23 further contribute to retaining the gasket initially in the channel 6 as does also the axial compression of the gasket in the channel. because of the relative diameters of the tip portion of lip 22 and the pipe and the shape of the lip as described above, an initial seal is provided between the tip portion of the lip and the pipe. As the line is filled and pressure builds up, the line pressure presses the lip 22 more firmly into engagement with the pipe. The shape of the lip is such that flexing of the lip under line pressure does not lift the tip portion 28 off the pipe. There is hence no tendency for line fluid to force itself between the pipe and the lip 22 of the gasket. In like manner, line pressure pressees the flange 21 and in particular the tip portion 25 against the channel walls to maintain a fluidtight seal between the gasket and the middle ring. Due to the convex outward shape of the lip 22, the tip is in tension when the pipe is stabbed in place whereas the butt portion is larger than the pipe and hence in compression when the gasket is under pressure. If the lip should develop a crack in service, such a crack would not penetrate beyond the neutral portion since in the compression area of the gasket the edges of the crack would be forced together.

The engagement of the shorter, stiffer lip 23 with the pipe is quite close to the end portion 20. Because of the shortness of the lip 23 and its proximity to the solid end portion 20 of the gasket, the lip engages the pipe with considerable radial pressure which is sufficient to prevent the entry of surface or ground water into the coupling when the pipe line is empty. As the line is filled—after it has been completed—irregularities of the pipe surface may permit some leakage of liquid past the intermediate lip 22 until the pressure builds up. This liquid is trapped between the lips 22 and 23 and, as pressure is applied to the line, the line pressure tends to flex the lip 22 radially inwardly, thereby applying pressure to the liquid trapped between the lips. The trapped liquid provides support for the central portion of the lip 22 and assists in preventing the latter lip from being "blown out" by excessive pressure. Moreover, even in the event there is no liquid trapped between the lips, the inwardly projecting end portion of the lip 23 supports the lip 22 for a substantial portion of its length to assist in preventing any blow out. The lip 23 has the further advantage of sealing off the portion of the pipe engaged by the lip 22 and protecting it against corrosion by ground water or soil. Hence, even though there may be axial movement of the pipe in the coupling because of temperature changes, the portion of the pipe engaged by the sealing lip 22 is kept corrosion free.

The couplings in accordance with the present invention have been found to provide a lasting watertight joint. However, even with the best couplings, it is sometimes necessary to make a repair and, for this purpose, many repair clamps have heretofore been devised. With the coupling in accordance with the invention, a repair can be very quickly, easily and economically effected, as is illustrated in Fig. 2. The inclined surface 12 of the axially projecting flange portion 10 provides an ideal seat for a compression-type gasket 40 which is pressed into engagement with the middle ring by a follower ring 41 and suitable pressure-applying means, such as bolts 42. The follower ring 41 has an annular recess 43 to receive the gasket. The outer peripheral surface 44 of the gasket recess 43 is of a diameter slightly larger than that of the outer peripheral surface 11 of the projecting flange portion 10, thereby providing a greater range of movement of the follower ring while providing substantially total confinement of the gasket to avoid cold flow. The gaskets and followers are suitably split for installation on a pipe line without opening the line.

In Fig. 4, there is shown another embodiment in which an endless steel band 50 presses the outer flange portion 21' of the gasket 2' into engagement with the inner peripheral wall of the channel 6. The band 50 is of a sufficiently large diameter as to provide radial pressure on the portion 21' of the gasket. This pressure is obtaineed either by expanding the band 50 in place by a suitable expanding tool or by making it of the desired diameter and springing it into place by first bending a circumferential portion of the gasket and band 50 inwardly toward the axis of the coupling in order to insert the gasket and band into the gasket channel and then permitting the deflected portion to snap out into place. The radial pressure provided by the band 50 further assures a completely tight seal between the gasket and the middle ring. It also holds the gasket firmly in place while the pipe is being stabbed into the coupling. If it is desired to install the gaskets before shipment to the job on which they are to be used, the bands 50 prevent displacement of the gaskets during shipment. The gasket shown in Fig. 4 has lips or flanges 21', 22' and 23' corresponding respectively to the lips 21, 22 and 23 of the gasket shown in Fig. 3, but will be seen to be of somewhat different shape. In particular, the intermediate lip 22' is angled, comprising a root portion approximately parallel to the lip 21' and a tip portion inclined axially and radially inwardly at an angle of about 35° to the lip 21'. It will be understood that a band like the band 50 of Fig. 4 may also be used with the gasket shape of Fig. 3 and that the shape of the gasket may be otherwise modified.

It is preferable to use a double-ended coupling as shown in Figs. 1 and 2 as this permits the use of pipe having both ends plain. Moreover, with a double-ended coupling of the construction shown, the middle ring can adjust itself to balance the forces applied to it and to accommodate misalignment of the pipe sections. However, features of the present invention are also applicable to single-ended couplings. Thus, a member corresponding to half of the middle ring may be welded or otherwise fixed to or made integral with one end of a pipe section and receive a plain end of an adjacent pipe section. The invention is also applicable to other fittings, such as T's, valve ends, etc. Still other applications and modifications of the invention will be apparent to those skilled in the art. The invention is thus not limited to the embodiments shown by way of example in the drawings. While certain parts have been referred as "outer," "inner," etc., it will be understood that such terms are used for convenience of identification and do not limit the structure herein described and claimed.

What I claim and desire to secure by Letters Patent is:
1. In a coupling for plain end pipe, a sleeve having spaced axially aligned pipe-receiving apertures and an inwardly facing channel between said apertures, said channel being of substantially rectangular cross section and having a substantially cylindrical peripheral surface and outer and inner end surfaces extending radially inwardly from said peripheral surface and terminating respectively in said apertures, an annular gasket of firm resilient elastomer material seated in said channel and comprising an annular outer end portion seating on said outer end surface of said channel and a plurality of annular flanges radiating from said outer end portion and comprising a substantially cylindrical outer flange portion extending axially inwardly from said outer end portion and seating on said substantially cylindrical peripheral surface, said outer flange portion terminating in an inwardly inclined angular lip portion in sealing engagement with the inner end surface of said channel, and a second flange portion extending axially and radially inwardly from said outer end portion at an acute angle to said outer flange portion and having a width approximately as great as that of said outer flange portion, said second flange terminating in an annular lip portion of smaller inside diameter than said apertures, and a stiff resilient annular cylindrical band engaging the radially inner face of said outer flange portion and pressing said flange radially outwardly into engagement with said peripheral surface of said channel, said band being disposed between said outer end portion of the gasket and said inwardly inclined tip portion of said outer flange portion so that said inclined tip portion is free of engagement by said band and thereby free to flex to conform to the inner end surface of said channel.

2. An annular gasket formed of firm elastic rubber composition and comprising in radial cross section an outer end portion and three flange portions all radiating from said end portion, all of said flange portions being disposed in a single quadrant defined by the axis and a radius of said annular gasket and comprising an outer flange portion extending substantially rectilinearly from said end portion in an axial direction and having a substantially cylindrical outer surface, said outer flange portion terminating in a tapered tip portion extending axially and radially inwardly at an angle to said outer flange portion, an inner flange portion that extends axially and radially inwardly from said outer end portion at an angle greater than 45° and less than 90° to the axis of said gasket and an intermediate flange portion that extends substantially axially inwardly from said outer end portion and then bends radially inwardly toward said axis so as to be convex toward said outer flange portion, said intermediate flange portion terminating in a lip portion defined in cross section by a substantially straight inner surface and an arcuate outer surface intersecting the inner surface at approximately right angles to provide a sharply defined corner edge, said intermediate flange portion being of approximately the same width as said outer flange portion and said inner flange portion being not more than half the width of said outer flange portion.

3. In a pipe coupling for plain end pipe, a sleeve having spaced axially aligned pipe-receiving apertures and an inwardly opening annular channel between said apertures, said channel being of substantially rectangular cross section and having a substantially cylindrical peripheral surface, an outer end surface and an inner end surface extending radially inwardly from said peripheral surface and terminating respectively in said apertures and an annular gasket of firm resilient elastomer material seated in said channel and comprising an outer end portion seated against said outer end surface of said channel and a plurality of flange portions radiating from said outer end portion and comprising an outer flange portion having a substantially cylindrical outer surface seated on said peripheral surface, said outer flange portion terminating in an inwardly inclined angular tip portion in sealing engagement with said inner end surface, an intermediate flange which in a relaxed condition extends first axially inwardly from said outer end portion and then bends radially inwardly at an acute angle to the longitudinal axis of the coupling, the bend in said intermediate flange portion being engageable with said outer flange portion to backup and thereby support said intermediate flange portion when expanded by a pipe received in said apertures, said intermediate flange having a width approximately equal to that of said outer flange, and an inner flange extending radially inwardly at an angle to said axis greater than the angle of said intermediate flange, the width of said inner flange being substantially less than that of said intermediate flange, said intermediate and inner flanges terminating in annular tip portions having inner diameters materially smaller in unconfined condition than said pipe-receiving apertures, the substantially rectangular cross sectional shape of said annular channel and corresponding shape of the gasket and the relative widths of said flange portions cooperating to retain the gasket from being displaced and from rolling when a pipe is stabbed in through said pipe-receiving apertures.

4. In a pipe coupling for plain end pipe, a sleeve having spaced axially aligned pipe-receiving apertures and an inwardly opening annular channel between said apertures, said channel being of substantially rectangular cross section and having a substantially cylindrical peripheral surface, an outer end surface and an inner end surface extending radially inwardly from said peripheral surface and terminating respectively in said apertures and an annular gasket of firm resilient elastomer material seated in said channel and comprising an outer end portion seated against said outer end surface of said channel and a plurality of flange portions radiating from said outer end portion and comprising an outer flange portion having a substantially cylindrical outer surface seated on said peripheral surface, said outer flange portion terminating in an inwardly inclined angular tip portion in sealing engagement with said inner end surface, the axial width of said outer flange portion of the gasket in an unconfined condition being greater than the axial width of said channel so that when the gasket is inserted in the channel the angular tip portion is flexed angularly with respect to the adjacent portion of said outer flange portion and by reason of the elasticity of the gasket material is thereby pressed axially into initial sealing engagement with the inner end surface of said channel, an intermediate flange which in unconfined condition extends axially and radially inwardly at an acute angle to the longitudinal axis of the coupling, said intermediate flange having a width approximately equal to that of said outer flange, and an inner flange extending radially inwardly at an angle to said axis greater than the angle of said intermediate flange, the width of said inner flange being substantially less than that of said intermediate flange, said intermediate and inner flanges terminating in annular tip portions having inner diameters materially smaller in unconfined condition than said pipe-receiving apertures, the substantially rectangular cross sectional shape of said annular channel and corresponding shape of the gasket and the relative widths of said flange portions cooperating to retain the gasket from being displaced and from rolling when a pipe is stabbed in through said pipe-receiving apertures.

5. A pipe coupling according to claim 4, in which the end surfaces of said channel converge slightly radially outwardly, and in which the radially outer surface of said outer flange portion of the gasket in relaxed condition has a diameter less than that of said peripheral surface of said channel and is thereby spaced radially from said peripheral surface, so that when line pressure is applied to the gasket the outer flange portion of the gasket moves radially outwardly to seat smoothly on said peripheral surface and to press said tip portion of said outer flange portion still more firmly against the inner end surface of said channel.

6. In a pipe coupling for plain end pipe, a sleeve having spaced axially aligned pipe-receiving apertures and an inwardly opening annular gasket recess between said apertures, said recess being of substantially rectangular cross section with an axially extending peripheral surface, an outer end surface and an inner end surface extending radially inwardly from said peripheral surface at approximately right angles and terminating respectively in said apertures, and an annular gasket of firm resilient elastomer material seated in said recess and comprising in axial cross section an anxially extending outer flange portion seating on said peripheral surface of said recess, a thickened outer end portion extending radially inwardly from the outer end of said outer flange portion and seating on the outer end surface of said recess, an inner end portion extending radially inwardly from the inner end of said outer flange portion and seating on the inner end surface of said recess, said outer flange portion, outer end portion and inner end portion together defining a channel that opens radially inwardly, an intermediate flange portion which in free position extends axially and radially inwardly from said outer end portion at an acute angle to to the longitudinal axis of the coupling, said intermediate flange having a width slightly less than that of said outer flange and being resiliently swingable radially outwardly from said free position to an outer position in which said intermediate flange portion lies in said channel defined by said outer flange portion, outer end portion and inner end portion of the gasket and extends substantially the full width of said channel, and an inner flange portion which in free position extends radially inwardly from said outer end portion at an angle to said axis greater than that of said intermediate flange, said inner flange having a width substantially less than that of said intermediate flange and being resiliently swingable to an outer position in which it lies against said intermediate flange and in said recess, said intermediate and inner flanges terminating in annular tip portions having inner diameters materially smaller in free condition than said pipe-receiving apertures, the substantially rectangular cross sectional shape of said recess and the cross sectional shape of the gasket cooperating to resist displacement of the gasket when a pipe is stabbed in through said pipe-receiving apertures and to provide a seal that is fluid-tight both with and without line pressure.

7. In a pipe joint for plain end pipe, a sleeve comprising integral portions defining spaced axially aligned pipe-receving apertures and an inwardly opening annular gasket-receiving channel between said apertures, said channel being of substantially rectangular cross section with an axially extending peripheral surface and inner and outer end surfaces extending radially inwardly from said peripheral surface at approximately right angles and terminating respectively in said apertures, a plain pipe end fitting into said pipe-receiving apertures, and an annular gasket of firm resilient elastomer material seating in said channel and comprising an outer end portion seating on said outer end surface of said channel, an axially extending outer flange portion extending axially inwardly from said outer end portion and seating on said peripheral surface of said channel, said outer flange portion terminating in a tip portion in sealing engagement with said inner end surface, the axial width of said outer flange portion of the gasket in an unconfined condition being greater than the axial width of said channel so that when the gasket is inserted in the channel said tip portion of said outer flange portion is flexed and by reason of the elasticity of the gasket material is resiliently pressed into initial sealing engagement with the inner end surface of said channel, an intermediate flange portion which in free position extends axially and radially inwardly from said outer end portion at an acute angle to the longitudinal axis of the pipe, said intermediate flange having a width slightly less than that of said channel and being resiliently swingable radially outwardly from said free position to an outer position in which said intermediate flange portion lies in said channel and extends substantially the full width of said channel, and an inner flange portion which in free position extends radially inwardly from said outer end portion at an angle to said axis greater than that of said intermediate flange, said inner flange having a width substantially less than that of said intermediate flange and being resiliently swingable to an outer position in which it lies against said intermediate flange and in said channel, whereby said pipe can have a diameter only slightly less than that of said apertures, the substantially rectangular shape of said channel and the cross sectional shape and proportions of said gasket cooperating to resist displacement of the gasket when said pipe is stabbed in through said pipe-receiving apertures and to assure a seal that is fluid-tight both with and without line pressure.

References Cited in the file of this patent

UNITED STATES PATENTS

| | | |
|---|---|---|
| Re. 20,497 | Johnson | Sept. 7, 1937 |
| 545,733 | Schmidt | Sept. 3, 1895 |
| 1,232,193 | Bowes | July 3, 1917 |
| 1,853,168 | Murphy | Apr. 12, 1932 |
| 1,888,539 | Otterson | Nov. 22, 1932 |
| 1,945,293 | Pierce | Jan. 30, 1934 |
| 1,967,466 | Damsel | July 24, 1934 |
| 2,083,966 | Stitzer | June 15, 1937 |
| 2,158,829 | Miller | May 16, 1939 |
| 2,314,386 | Brend | Mar. 23, 1943 |
| 2,572,058 | Sarosdy | Oct. 23, 1951 |

FOREIGN PATENTS

| | | |
|---|---|---|
| 623,780 | Germany | Jan. 4, 1936 |
| 455,605 | Italy | Mar. 9, 1950 |